United States Patent
Pintos (10) Patent No.: US 10,832,221 B2
(45) Date of Patent: Nov. 10, 2020

(54) STORAGE AND STRUCTURE OF CALENDARS WITH AN INFINITE SET OF INTENTIONAL-TIME EVENTS FOR CALENDAR APPLICATIONS

(71) Applicant: Microsoft Technology Licensing, LLC, Redmond, WA (US)

(72) Inventor: Fabio Andre Pintos, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 847 days.

(21) Appl. No.: 15/216,042

(22) Filed: Jul. 21, 2016

(65) Prior Publication Data

US 2018/0025323 A1 Jan. 25, 2018

(51) Int. Cl.
*G06Q 10/10* (2012.01)
*G06F 3/0481* (2013.01)
*G06F 3/0482* (2013.01)

(52) U.S. Cl.
CPC ....... *G06Q 10/1093* (2013.01); *G06F 3/0482* (2013.01); *G06F 3/04817* (2013.01); *G06Q 10/109* (2013.01)

(58) Field of Classification Search
CPC .............. G06Q 10/1093; G06Q 10/109; G06Q 10/06314; G06F 3/04817; G06F 3/0482; G06F 3/04883; Y10S 707/951; Y10S 715/963; Y10S 425/235; H04L 47/568; G01C 21/362

See application file for complete search history.

(56) References Cited

U.S. PATENT DOCUMENTS

| | | | | |
|---|---|---|---|---|
| 4,512,667 A | * | 4/1985 | Doulton | G01C 17/04 33/355 R |
| 6,108,640 A | * | 8/2000 | Slotznick | G06Q 30/06 705/7.18 |
| 6,640,145 B2 | * | 10/2003 | Hoffberg | G05B 19/0426 700/17 |
| 6,907,582 B2 | * | 6/2005 | Stanley | G06Q 10/109 345/440 |

(Continued)

OTHER PUBLICATIONS

Integrating Calendar Dates and Qualitative Temporal constraints in the Treatment of Periodic Events, by Paolo Terenziani, IEEE Transactions on Knowledge and Data Engineering, vol. 9 No. 5, Sep./Oct. 1997.*

(Continued)

*Primary Examiner* — Tyler W Knox
(74) *Attorney, Agent, or Firm* — Talem IP Law, LLP (57) ABSTRACT

An event can be stored using an indication of recurrence and an intent-time event time that includes a trigger indicator and optionally an offset. When a view of a calendar having intentional-time events is requested by a calendar application, a calendar service can search a storage resource for the requested calendar and any events that fall within a requested start time and end time. The identified events can be provided to a source of the request. Any intent-time event times that are stored as part of intentional-time events can be calculated based on their triggers and offsets. The calculations may be carried by the calendar service and the results provided to the calendar application or by the calendar application itself.

11 Claims, 8 Drawing Sheets

(56) References Cited

U.S. PATENT DOCUMENTS

| | | | | |
|---|---|---|---|---|
| 7,080,018 | B1* | 7/2006 | Fox | G06Q 30/02 |
| | | | | 705/14.5 |
| 8,254,962 | B2* | 8/2012 | Carro | H04M 1/72572 |
| | | | | 455/456.3 |
| 8,489,321 | B2* | 7/2013 | Lee | G01C 21/3697 |
| | | | | 701/400 |
| 9,262,368 | B2* | 2/2016 | Simison | G06Q 10/1095 |
| 2002/0131565 | A1* | 9/2002 | Scheuring | G06Q 10/109 |
| | | | | 379/88.19 |
| 2006/0002236 | A1* | 1/2006 | Punkka | G04R 20/14 |
| | | | | 368/21 |
| 2006/0224323 | A1* | 10/2006 | Zhu | G06N 3/126 |
| | | | | 702/2 |
| 2007/0150503 | A1* | 6/2007 | Simison | G06F 15/16 |
| 2007/0287140 | A1* | 12/2007 | Liebowitz | G04B 19/10 |
| | | | | 434/304 |
| 2008/0059256 | A1* | 3/2008 | Lynch | G06Q 10/063 |
| | | | | 705/7.24 |
| 2008/0097815 | A1* | 4/2008 | Koretz | G06Q 10/109 |
| | | | | 705/7.19 |
| 2008/0215691 | A1* | 9/2008 | Chhatrapati | G06Q 10/1093 |
| | | | | 709/206 |
| 2009/0157513 | A1* | 6/2009 | Bonev | G06Q 30/02 |
| | | | | 705/14.69 |
| 2009/0158186 | A1* | 6/2009 | Bonev | G06Q 30/00 |
| | | | | 715/769 |
| 2009/0240972 | A1* | 9/2009 | Simison | G06Q 10/109 |
| | | | | 713/502 |
| 2009/0278479 | A1* | 11/2009 | Platner | H05B 47/105 |
| | | | | 315/312 |
| 2009/0313299 | A1* | 12/2009 | Bonev | G06F 3/0481 |
| 2010/0226213 | A1* | 9/2010 | Drugge | G04G 9/0082 |
| | | | | 368/14 |
| 2010/0229101 | A1* | 9/2010 | Lagerstedt | G06Q 10/109 |
| | | | | 715/748 |
| 2010/0318424 | A1* | 12/2010 | LaValle | G06F 19/3418 |
| | | | | 705/14.58 |
| 2013/0046788 | A1* | 2/2013 | Goldstein | G06Q 10/02 |
| | | | | 707/780 |
| 2013/0326583 | A1* | 12/2013 | Freihold | G06F 21/32 |
| | | | | 726/3 |
| 2014/0074815 | A1* | 3/2014 | Plimton | G06F 16/26 |
| | | | | 707/709 |
| 2014/0282011 | A1* | 9/2014 | Dellinger | G06F 3/0485 |
| | | | | 715/731 |
| 2014/0365120 | A1* | 12/2014 | Vulcano | G01C 21/3679 |
| | | | | 701/532 |
| 2015/0066970 | A1* | 3/2015 | Guzman | G06F 16/284 |
| | | | | 707/758 |
| 2015/0178690 | A1* | 6/2015 | May | G06Q 10/1095 |
| | | | | 705/7.19 |
| 2015/0278737 | A1* | 10/2015 | Chen Huebscher | |
| | | | | G06Q 10/06314 |
| | | | | 705/7.18 |
| 2016/0357420 | A1* | 12/2016 | Wilson | G06F 3/04883 |
| 2016/0360382 | A1* | 12/2016 | Gross | G06F 3/04883 |
| 2017/0109349 | A1* | 4/2017 | Rosen | G06F 16/23 |
| 2017/0109391 | A1* | 4/2017 | Rosen | G06F 16/2291 |
| 2018/0024704 | A1* | 1/2018 | Pintos | G06F 3/04847 |
| | | | | 715/810 |

OTHER PUBLICATIONS

"International Search Report and Written Opinion Issued in PCT Application No. PCT/US2017/040631", dated Aug. 25, 2017, 10 pages.

Dube, Ryan, "Awesome Things You Can Automatically Import to Google Calendar", Published on: May 9, 2014 Available at: http://www.makeuseof.com/tag/awesome-things-can-automatically-import-google-calendar/.

"Sunrise Sunset Calendar", Published on: Jul. 8, 2011 Available at: http://sunrise-sunset-calendar.soft112.com/.

"Rise—The Sunrise Sunset Calendar", Retrieved on: Apr. 21, 2016 Available at: Rise—The Sunrise Sunset Calendar.

"Get sunrise and sunset time based on latitude and longitude", Retrieved on: Apr. 26, 2016 Available at: https://social.msdn.microsoft.com/Forums/vstudio/en-US/a4fad4c3-6d18-41fc-82b7-1f3031349837/get-sunrise-and-sunset-time-based-on-latitude-and-longitude?forum=csharpgeneral.

"Birthdays, holidays, and other calendars", Retrieved on: May 2, 2016 Available at: https://support.google.com/calendar/answer/6084659?co=GENIE.Platform%3DDesktop&hl=en&oco=0.

"Google Calendar API", Retrieved on: May 9, 2016 Available at: https://developers.google.com/google-apps/calendar/v3/reference/events.

"Resource reference for the Mail, Calendar, Contacts, and Task REST APIs", Retrieved on: May 9, 2016 Available at: https://msdn.microsoft.com/office/office365/api/complex-types-for-mail-contacts-calendar#DateTimeTimeZoneV2.

* cited by examiner

STORAGE AND STRUCTURE OF CALENDARS WITH AN INFINITE SET OF INTENTIONAL-TIME EVENTS FOR CALENDAR APPLICATIONS

BACKGROUND

Sometimes, users would like to include events in their calendars that show or are based on recurring phenomena such as sunrise and sunset. While there are websites and various applications available for providing end users with the times for astronomical phenomena such as the sunrise and sunset based on a location, the data would either need to be manually entered into a user's calendar or an ICS or other calendar data exchange format file would need to be imported.

Calendar applications currently store time as a date and a time of day. Any information on the underlying purpose of a particular date and time would not be stored in the current date and time format. For example, a sunset time would be stored as a date/time by the calendar application without association with the underlying event—the sunset for that day and location—from which that time was originally obtained. Furthermore, because astronomical and other location or geographical dependent phenomena do not follow recurring pattern that is easily represented by calendar applications, each event is stored separately, which can consume significant storage resources or involve limiting the range of dates to a certain time period.

BRIEF SUMMARY

Storage and structure of an infinite set of intentional-time events for calendar applications are described.

An infinite set of intentional-time events can be stored using an indication of recurrence, and an intent-time event time that includes a trigger indicator and optionally an offset. An example process for creating an intentional-time event for a recurring-type event includes, when an input indicative of an intentional-time event for a recurring-type event is received, storing an indication of recurrence for the event in a storage resource storing calendar data; and storing a trigger indicator and an offset as an event time property for the event in the storage resource.

When a view of a calendar having an infinite set of intentional-time events is requested by a calendar application, a calendar service can search a storage resource for a requested calendar and any events, including intentional-time events for recurring-type events, that fall within a requested start time and end time. Any identified intentional-time events for recurring-type events that fall within the start time and the end time can be provided to a source of the request, and the actual start times of the occurrences can be calculated using the trigger indicator and offset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Storage and structure of calendars with an infinite set of intentional-time events for calendar applications are described. An intentional-time event for recurring-type events can include a time variance, which means that the event is a repeating event that may actually occur at different times depending on a number of factors (for example, natural phenomena influencing astronomical and tide activities). It should be understood that there may be a pattern to the intentional-time event, but the pattern is based on an external trigger. The actual time of each event is not fixed. Rather, the actual time can change depending on the day, time, and the location of the trigger.

A trigger refers to an event or occurrence upon which the actual time is based. The trigger provides a reference point for the time of the event. While location may contribute to the time of the trigger event, a trigger-based time does not refer to simply a change in time zone (as that is considered one of the standard time options).

It should be understood that the term 'infinite' in 'infinite set of events' is infinite within the limits of a computing system (e.g., the calendaring system/calendar application or service executed by the computing system), which may not be able to recognize dates that are too far in the past or too far in the future. In particular, the infinite set of events may be constrained within the limits of date ranges represented by the system. This is a similar constraint to that of a typical recurring event.

A calendar application may include components that are local (at a user's device) and components that are residing on a server, which can provide access and syncing of calendar items across multiple devices and/or storage of the user's calendar items. In some cases, the calendar application is part of a larger personal information management service that forms a coordinated storage system for more than one user. In various implementations, the calendar application may be a rich client on a desktop or laptop (e.g., Microsoft Outlook®), a mobile client on a mobile device (e.g., a calendar application on the Android OS®, iCal for iOS®, Outlook® for Windows Phone®, or Cal from Any.do), or part of an application running as cloud services accessible via a web browser (e.g., Google® Calendar, Microsoft® Outlook Web App (OWA)).

Many calendar applications can manage one or more of the following three types of events: individual events, recurring events, and non-pattern occurrence events.

An "individual event" is a single event having a date and time (and which may have a start and end time).

A "recurring event" is where an event is set to occur at the same time each day (and can be the same date each week or month or year).

A "non-pattern occurrence event" is where there is no pattern, but there is a reason to be connected, for example as a group of events. As an illustrative example, a non-pattern occurrence may be identified from a group of events that have attendees, topic, or something else in common, but that are scheduled for Thursday at 3 pm, Friday at 4 pm and Tuesday at 3 pm. The finite group of events can be connected in a manner that provides certain additional functionality at the calendar application that could be acted upon the group; however, these non-pattern occurrence events would be stored separately, such as in different rows in a database. One example for how the non-pattern occurrence event arises is that a recurring event is edited such that certain of the meetings are changed to different dates and/or times. The calendar application stores the changed event (one of the meetings that are changed to a different date and/or time than what the recurrence would set the event for) in its own row, but links that event to the recurrence so it would still be grouped with the recurring events.

Instead of defining events solely by a fixed date and/or time as defined by a user, an intentional time or "intent-time" structure is provided. The intent-time structure of an event involves using a time that is relative to an external trigger. The amount of time relative to the external trigger may be a time span (e.g., minute increments) and can be before or after the trigger. This amount of time can be considered an "offset". For example, the offset can be +0:30, which indicates 30 minutes after the trigger, or −1:00, which indicates 1 hour before the trigger.

The trigger can be an astronomical event, such as SUNRISE, SUNSET, MOONRISE, or MOONSET, at a given LOCATION. The trigger can be other cyclic physical phenomena, such as HIGH TIDE and LOW TIDE predictions. Of course, the trigger is not limited to physical phenomena. An example intent-time structure can be given as "+1:30 SUNRISE(47° 41'9"N 122° 11'30"W)," which represents 1.5 hour after the sunrise at Kirkland, Wash. Another example intent-time structure is "−0:45 LOWTIDE (TWC0895)." Which represents 45 minutes before the low tide at Harrington Point, Wash. Since a trigger may be based on a time varying event, a recurring-type event can be a time variance recurring event.

Advantageously, an infinite set of events can be created with a small amount of information. The "small" amount of information is a single entry (but not a singular unit of information) for an event's time (referred to in the examples as "EventTime") that holds a number of parameters. The event's time is a function that can be executed at a server or at a client device. This allows for a full calendar to be created without importing a lot of data into the database (or other data structure for the calendar information).

In a proposed model, using a pseudo-code/pseudo-language, intentional time calendars can be identified as:
  class Calendar{ . . . string Name; Color Color; Event[ ] Events;}.

The string Name displays the name of the calendar. The Color indicates the color of the calendar, and Event[ ] Events indicates the set of events, which allows the calculation of the exact time of each event on any given day.

An event can be stored as class Event, which has a property to indicate the intentional time. In one example, an event can be represented as:
  class Event{ . . . string Subject; EventTime StartTime; DateTimeOffset Start; . . . }.

The EventTime represents the actual time of an event; it is an abstract type, since time can now be represented in different ways. The actual time of an event becomes an offset based on the time in which the event is triggered. The time in which the event is triggered can be based on any number of things including natural phenomena.

The EventTime can be represented as:
  abstract class EventTime {TimeSpan Offset; DateTimeOffset GetActualTime(DateTimeOffset date) {Return this. GetTriggerTime(date)+this.Offset;} abstract DateTimeOffset GetTriggerTime(DateTimeOffset date);}.

It should be noted that the TimeSpan referred to as the Offset is independent of the "reminder" of an event; it serves to set how much time before or after the trigger the event will happen. If the offset is positive, it indicates time AFTER the trigger. If the offset is negative, it indicates time BEFORE the trigger. If the offset is zero, the event time will be the same as the trigger. GetActualTime returns the actual time of the event on the given date and the GetTriggerTime returns the time of the trigger on the given date.

Sometimes the actual time of an event varies by location. For handling those types of events, the EventTime can be represented as abstract class LocationBasedTime: EventTime{GeographyPoint Location; String LocationName;}.

The GeographyPoint Location is the geographic point (latitude, longitude) that should be used when calculating the time of the event. The String LocationName refers to a human readable name of the location, to be used by user interfaces.

There are a number of astronomical phenomena that the system can support, for example, enum AstronomicalPhenomena{Sunrise, SolarNoon, Sunset, Moonrise, Moonset,}. Thus, for an actual time of an event that varies based on astronomical phenomena (which is also a time that varies by location, the AstronomicalEventTime can be represented as class AstronomicalEventTime:LocationBasedTime {AstronomicalPhenomena Phenomena; DateTimeOffset GetTriggerTime(DateTimeOffset date) {return GetTimeOfAstronomicalPhenomena(date, this.Phenomena, this.Location);}}.

The AstronomicalPhenomena Phenomena describes the type of astronomical calculation the event will perform (the "Phenomena" is an indicator of which astronomical phenomena used). The GetTriggerTime calculation identifies the time when the specified astronomical phenomenon happens at the specified location.

Another naturally varying time is based on the tides. As an example, the system can support enum TidePhenomena {FirstHighTide, FirstLowTide, SecondHighTide, SecondLowTide}. Thus, for an actual time of event that varies based on the tides (which is also a time that varies by location), the TideEventTime can be represented as class TideEventTime:EventTime{String StationName; TidePhenomena Phenomena; DateTimeOffset GetTriggerTime(DateTimeOffset date) {return GetTidePhenomenaTime(date, this. Phenomena, this. StationName);}}.

The StationName is the name of the station that provides tide levels. The TidePhenomena Phenomena describes the type of tide calculation the event will have. The GetTriggerTime calculation identifies when the specified tide happens at the specified location (based on the station name).

Figure 1:
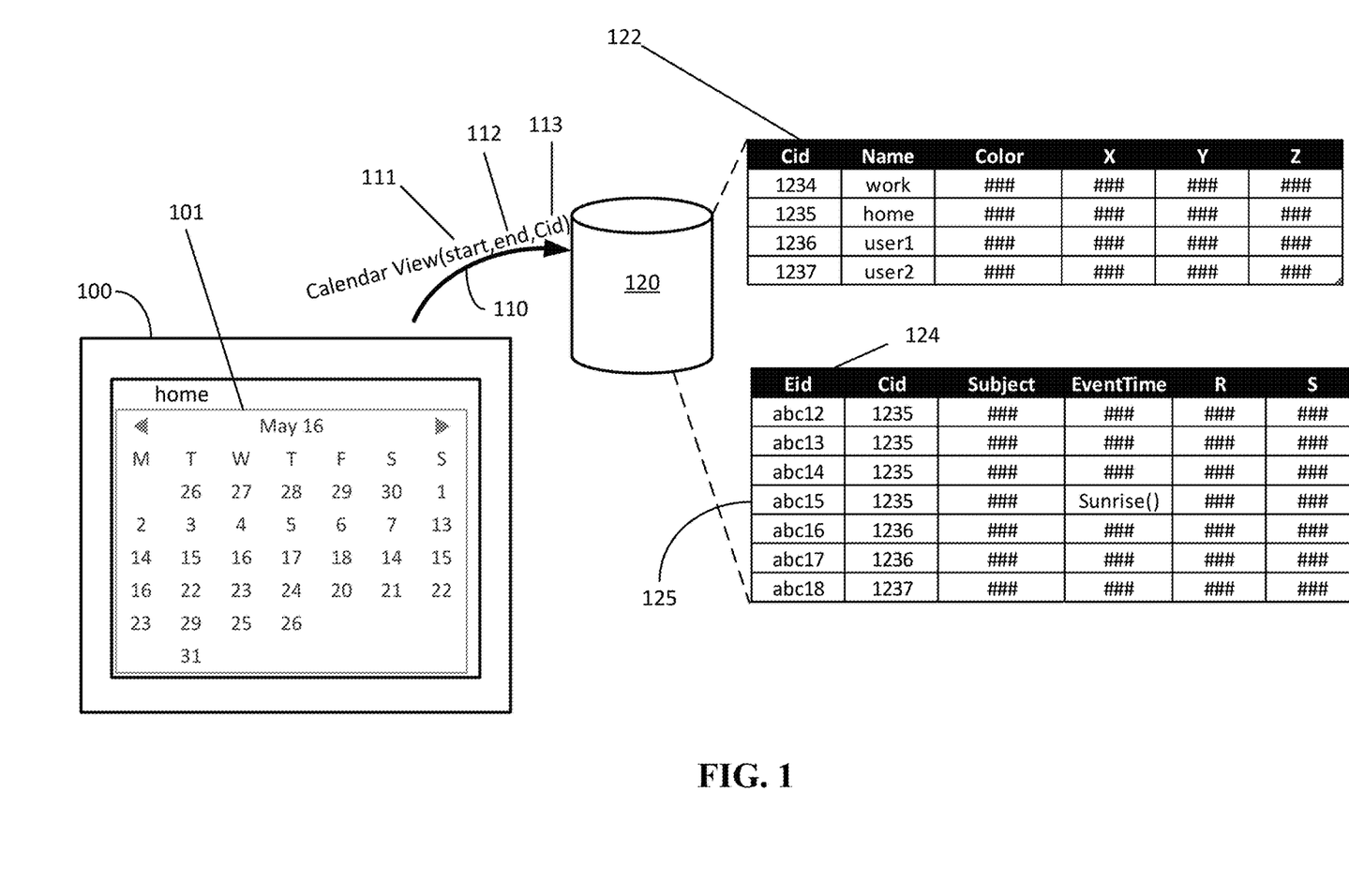
FIG. 1 illustrates a calendar request and example storage structure.

FIG. 1 illustrates a calendar request and example storage structure. Referring to FIG. 1, when a user selects to view a calendar 101, the client calendar application at a user computing device 100 requests (110) a calendar view from a storage resource 120 (or server managing the storage resource). The storage resource 120 can store a table (or other data structure) of calendars. For example, a calendar database 122 can store a calendar id, the name of the calendar, a color (for the user interface), access/share permissions of users, and any other properties of the calendar object. The storage resource 120 can also store a table (or other data structure) of events. For example, an event database 124 can provide a set of events. Each event can include an event identifier, the calendar id of the calendar where the event lives, a subject, an event date/time, and any other information.

The request 110 can include a start date 111, an end date 112, and a calendar identifier (Cid) 113. In some cases, there are no parameters passed as part of the request (or only some parameters are passed) and the server uses default settings such as "this month" and/or "default calendar" to pull the appropriate start date, end date, and calendar. The start and end date refer to the dates available in the particular view the user would like to see (e.g., May 1 to May 31 in the example). The calendar service identifies the calendar from the calendar id in the structured data (e.g., calendar database 122) stored at the storage resource 120 and populates the calendar with the events associated with that calendar id (e.g., from event database 124).

The calendar application receives the events that fall within the requested date range. Some of the events may be individual events. For recurring events, the server applies the rules/expansion calculations from the events listed as recurring and pulls the events falling within the date range. Since intentional-time can be applied to any type of event, including recurring-type events, the time of each event can be in the form of intent-time, discussed in more detail below with respect to the object "EventTime". For example, in this illustration, if the Cid was the user's home calendar, a sunrise-based time event 125 is included in the events. In order to display the calendar view, either the client or the server calendar application may calculate the intentional time of the events so that the event displays at the appropriate time in the user's calendar. In some cases, the server can perform the calculation so clients that are not aware of intentional time continue to work without modification. For cases where clients are aware of intentional time, such clients can request that information and perform various actions upon it, such as showing a rich user interface to the user.

The events can be displayed to the user in any suitable user-oriented array design. For example, the events can be put on an existing calendar or provided as a separate calendar. A calendar having the infinite set of intentional-time events can be added to a user's account (as an additional calendar) or the infinite set of intentional-time events can be added to an existing calendar. In some cases, certain intentional-time events for recurring events that are in the form of cyclic phenomena can be presented as icons in the day/week/month views in a primary calendar (e.g., part of a user's existing calendar).

Figure 2A:
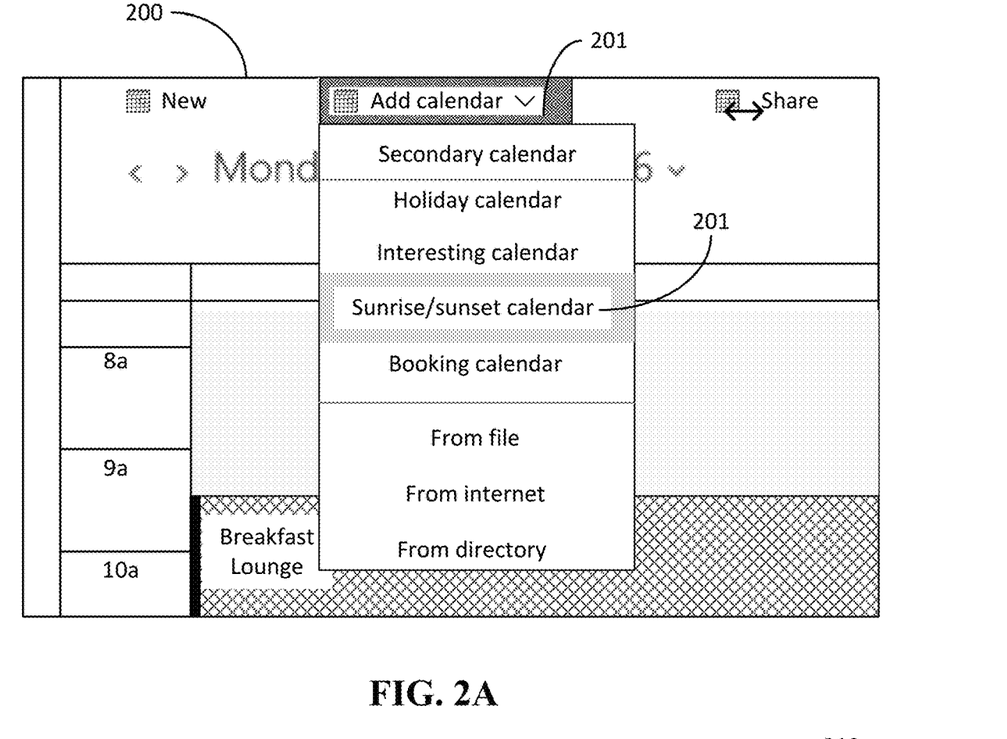
FIGS. 2A-2C illustrate a process of adding a calendar having available an infinite set of intentional-time events to a user's account.
Figure 2B:
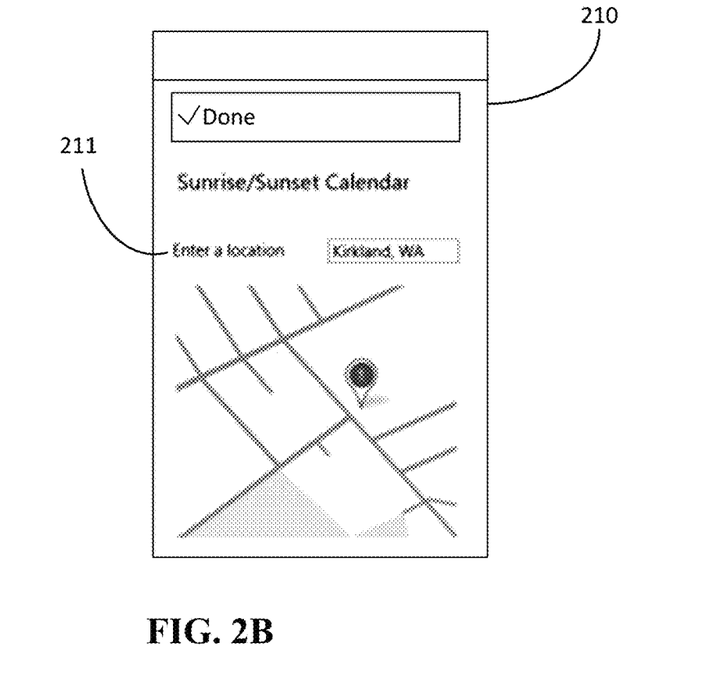
Figure 2C:
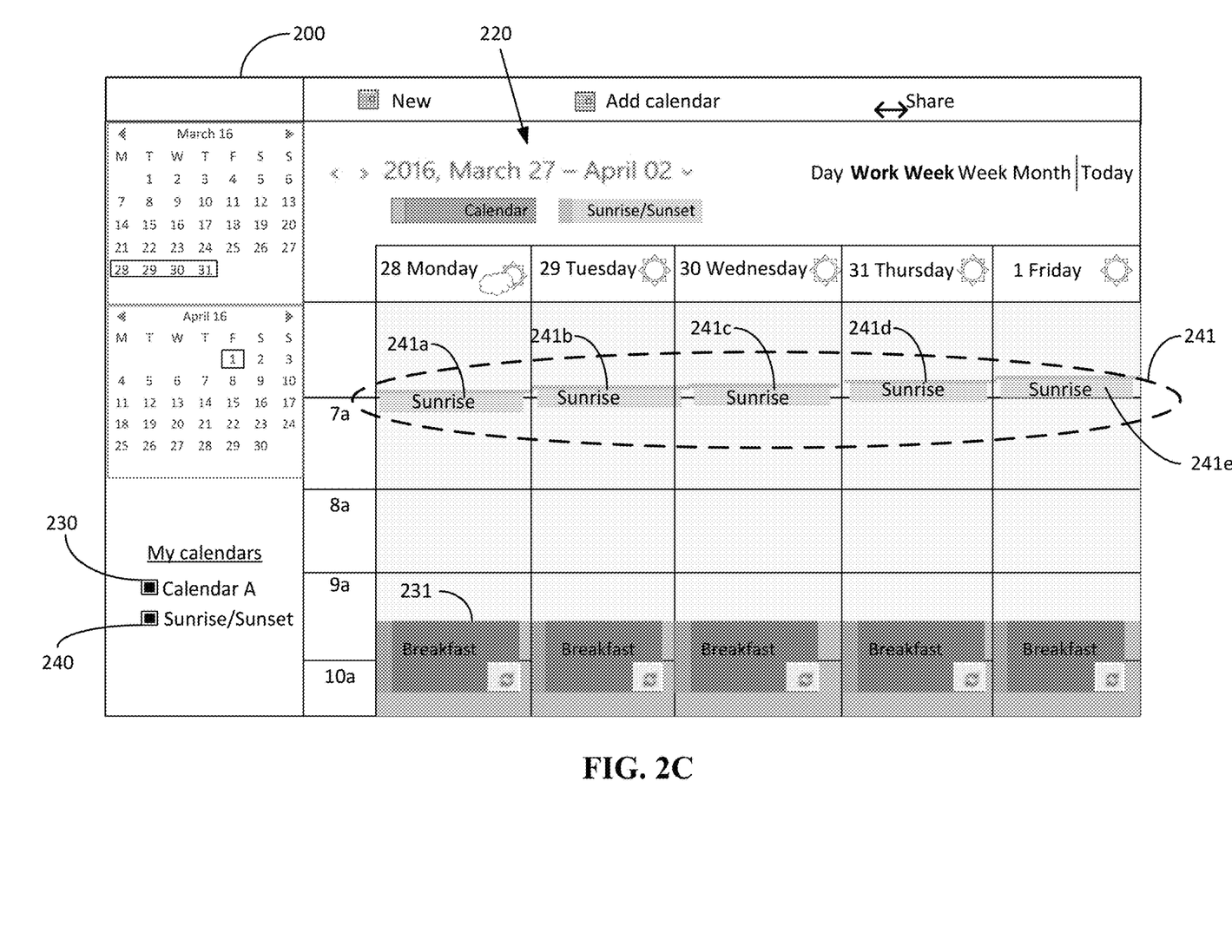

FIGS. 2A-2C illustrate a process of adding a calendar having available an infinite set of intentional-time events to a user's account. The user can add a calendar with an infinite set of intentional-time events, such as based on cyclic phenomena like sunrise and sunset. For example, as illustrated in FIG. 2A, additional calendars may be added through a menu of a calendar application graphical user interface 200. In this illustration, the user selects Add Calendar 201→Sunrise/Sunset Calendar 202, which results in a user interface 210 as shown in FIG. 2B, in which the user can enter a location. As illustrated in FIG. 2B, a user can indicate a location 211, which in this example is Kirkland, Wash.

A new calendar folder is created, populated with events that happen at sunrise and sunset. In this example, since the user wants to create a calendar that displays the sunrise and sunset in Kirkland, Wash., the calendar application can create a calendar as follows (in pseudo-code):

calendar=new Calendar {Name="Solar calendar in Kirkland, Wash." }
    calendar. Events=new[ ] {
        new Event {Subject="Sunrise in Kirkland, Wash.",
            IntentionalStartTime=new AstronomicalEventTime
            {Phenomena=AstronomicalPhenomena.Sunrise,
            LocationName="Kirkland, Wash.",
            Location=GetCoordinates("Kirkland, Wash.")}},
        new Event {Subject="Sunset in Kirkland, Wash.",
            IntentionalStartTime=new AstronomicalEventTime
            {Phenomena=AstronomicalPhenomena.Sunset,
            LocationName="Kirkland, Wash.",
            Location=GetCoordinates("Kirkland, Wash.")}}
    }

The above method does not lead to the creation of individual calendar events on each and every day.

FIG. 2C illustrates the graphical user interface 200 having a "week" view 220 of the two calendars selected by the user to view. The Calendar A 230 has the recurring event 231 of a 9:30 am breakfast, while the Sunrise/sunset calendar 240 has the recurring events of sunrise 241 and sunset (not shown in the view). As can be seen from FIG. 2C, the calculated time of the events change; they (e.g., 241a, 241b, 241c, 241d, 241e) are not in the same time as the days go by.

When a user opens a calendar within a calendar application, a variety of views are available. For example, day, week, and month views. In a case that a user selects a month view, at the time of selection of a particular month, the calendar application gets that month's view and the events are calculated at that time. This process is similar to the calculations that take place to populate a view's events with recurring events (e.g., client asks server for calendar dates, server creates an array of data objects, client has no particular indication that the objects do not actually exist in the database). As the user clicks through months in the month view or days in the day view, the calendar application calculates the event times at the time the date is displayed.

For example, a client application will request a calendar view from the system. At this point the system calculates the exact time of each event from its intentional time. For example:

foreach (day in calendar_view_days)
        foreach (Event in calendar.Events)
            yield new Event {Subject=Event.Subject, Start=Event.IntentionalStartTime.GetActualTime (day)}.

Figure 3A:
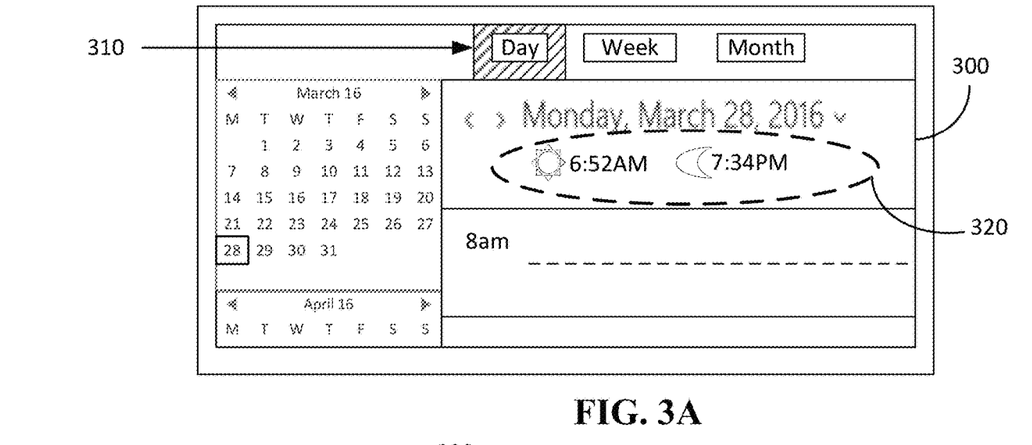
FIGS. 3A-3C illustrate example views of intentional-time events for recurring-type events included in a calendar.
Figure 3B:
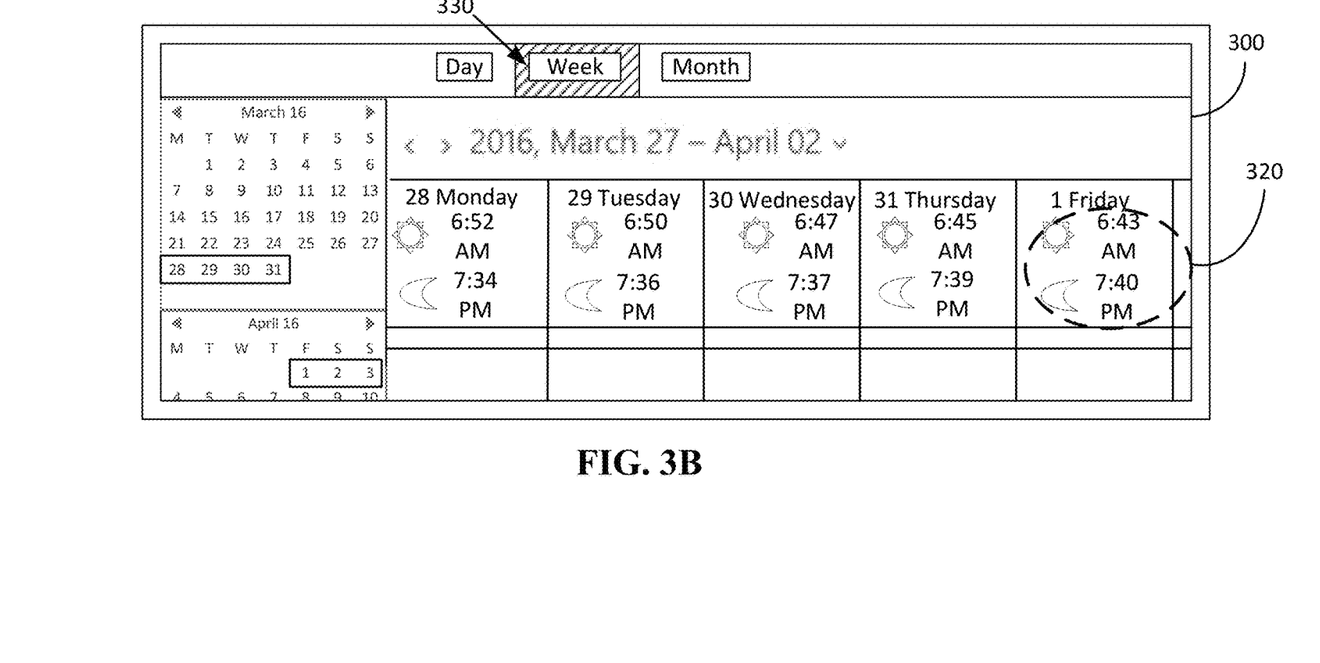
Figure 3C:
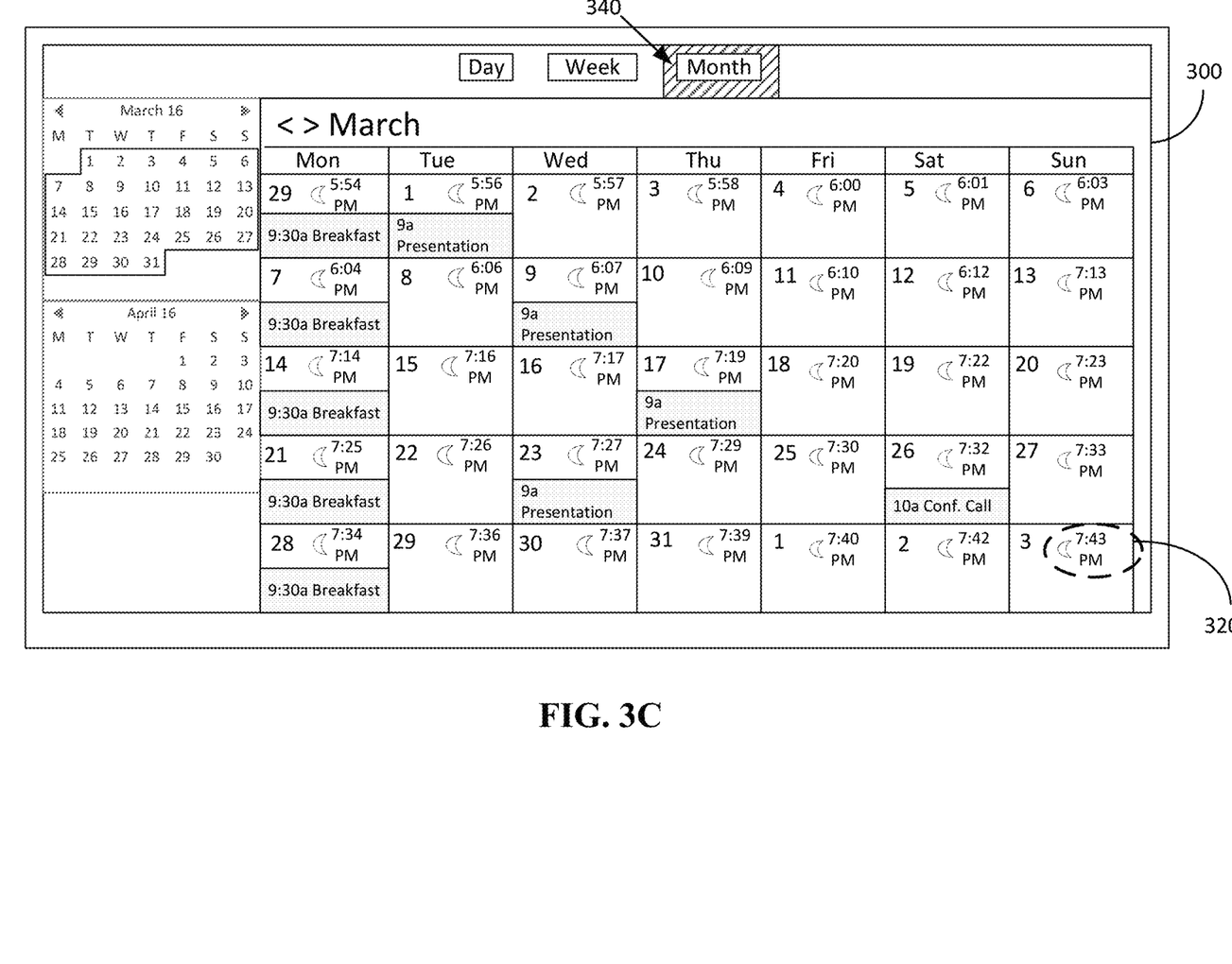

FIGS. 3A-3C illustrate example views of intentional-time events for recurring-type events included in a calendar. FIG. 3A illustrates a graphical user interface 300 of a calendar application showing a calendar in a day view 310 with icons 320 for sunset and sunrise calculated as an intentional-time event. FIG. 3B illustrates the interface 300 in a week view 330 with icons 320; and FIG. 3C illustrates the interface 300 in the month view 340, showing the icons 320 that were calculated as described herein. As a user moves through the days, weeks, or months in any of the calendar views, an infinite set of the intentional-time events (indicated by icons 320) is calculated from effectively single event.

As mentioned above, an infinite set of events can be created with a small amount of information. This allows for a full calendar to be created without importing a lot of data into the database (or other data structure for the calendar information).

Figure 4A:
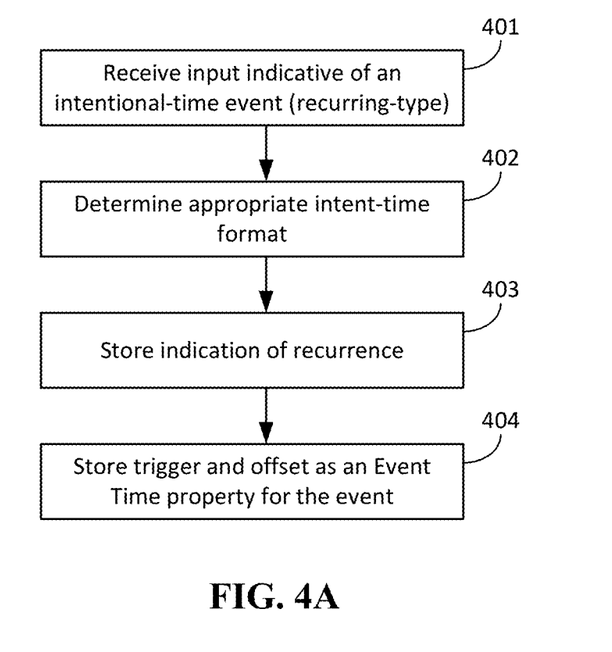
FIG. 4A illustrates a process of creating an infinite set of intentional-time events.
Figure 4B:
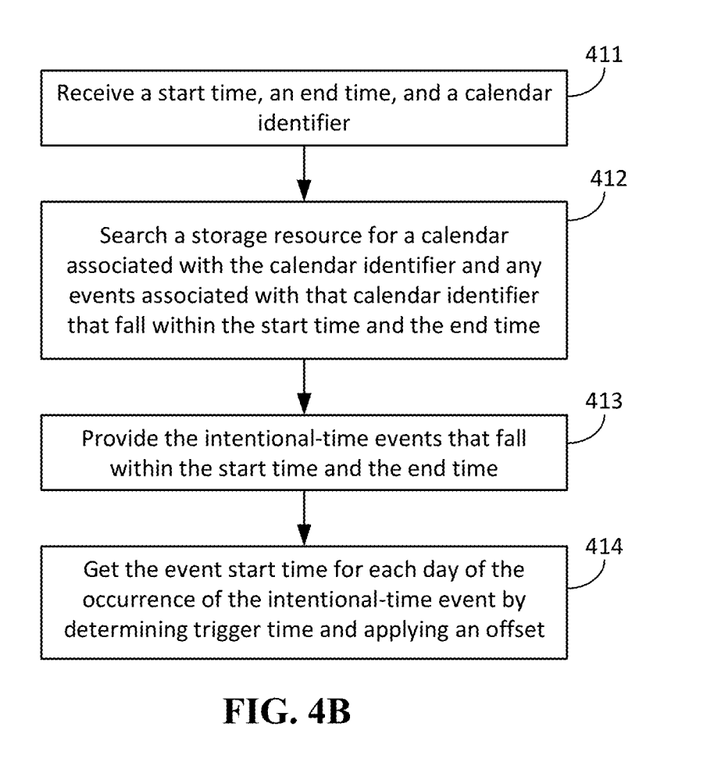
FIG. 4B illustrates a process of viewing a calendar having an infinite set of intentional-time events.

FIG. 4A illustrates a process of creating an infinite set of intentional-time events; and FIG. 4B illustrates a process of viewing a calendar having an infinite set of intentional-time events. Referring to FIG. 4A, a new intentional-time event for a recurring-type event can be created by receiving input indicative of an intentional-time event for a recurring-type event (401). For example, a new intentional-time event for a recurring event can be created from an input incorporating a time value (1 h, 30 minutes, etc.), the direction of the offset (BEFORE/AFTER), and a trigger (along with any additional information the trigger wants, which can be a simple string that the trigger evaluates). From the input, the appropriate intent-time format can be determined (402). This determination can be accomplished through any suitable technique (e.g., using a slot filler and classifier; or receiving an explicit instruction of the type of intent-time such as a request for a sunrise/sunset calendar). The determination of the appropriate intent-time format can be used to identify the additional information that may be needed for a trigger (e.g., location). The event can be stored with a property, or indication, of recurrence (403); and the trigger (e.g., a trigger indicator and any additional information for the intent-time format) and offset (if any) can be stored as an Event Time property for the event (404). The Event Time property may take the place of a standard start time/end time property.

Thus, the calendar is created in storage with settings that define what types of events will be displayed and the system will calculate the times when they occur based on these settings. The intentional-time events may be the time variant events such as sunrise/sunset themselves or events that are triggered from those time variant events. As indicated above, the input is an offset (e.g., a value and direction or none) and a trigger (e.g., sunset, moonset, tide, or other cyclic/time variant phenomenon that can act as a reference point). For location-based triggers, it can be noted that the location of the trigger is not necessarily the location of the event the user wants to associate it with. For example, a student in a missionary school might want to create a recurring event for: Subject: morning prayer group; Location: dorm's chapel; Time: 30 min before sunrise (in Kirkland, Wash.). In this case, the location of the event is in the chapel, while the location of the trigger is Kirkland.

Although events can be created with a time that is relative to an external trigger, the human description of the time of the event is fixed. This human description is reflected in the graphical user interface of the calendar application, for example by indicating that the event starts at 9 am (or 6:52 am as indicated for icon 320 in FIG. 3A). However, the actual time of the event is not fixed since it is stored in the intent-time format.

As another example story scenario: Kate lives in Kirkland and wants to be home before sundown every Friday. She creates a recurring Event in a calendar application with the input "Every Friday, 1 H BEFORE SUNSET @ Kirkland, Wash.". Every occurrence of this event happens in a different time, depending on the day of the year, but Kate does not need to manually calculate them; the system simply sets up each occurrence with the correct time. In this case, the system could use a geolocation service such as available from Bing or Google to resolve the human expression of location to a set of coordinates, and store that in the event.
    event=new Event( );
    event.Recurrence=new WeeklyRecurrencePattern {DaysOfWeek=(Friday)}
    event. StartTime=new AstronomicalEventTime {Offset=TimeSpan.FromHours(−1),
    Phenomena=AstronomicalPhenomena.Sunset,
      LocationName="Kirkland, Wash.",
    Location=GetCoordinates("Kirkland, Wash.")}.

It should be noted again that in this case, the system does not need to pre-calculate a "Start" time; each instance of the occurrence will have its own time. When providing a calendar view, the system can calculate the exact time of each occurrence by calling: event.StartTime.GetActualTime (day_of_the_occurence).

In a more general sense, as shown in FIG. 4B, when the calendar server receives a start time, an end time, and a calendar identifier (411), the server searches (412) a storage resource for a calendar associated with (e.g., identified by) the calendar identifier and any events associated with that calendar identifier that fall within the start time and the end time being displayed by the calendar application. Of course, as mentioned above, there may not be any parameters passed with the request, and the calendar server uses a default start, end, and/or calendar. The events, including intentional-time events of the recurring-type that fall within the start time and the end time can be provided (413) from the server to the client calendar application; and the event start time for each day of the occurrence of the intentional-time event can be gotten by determining the trigger time and applying the offset (414). In some cases, the calendar application gets the event start time in this manner. In other cases, the server performs this step and provides the event start times with the instances of the intentional-time events (e.g., operation 414 would be performed before operation 413).

As can be seen from the prior examples, intent-time is polymorphic in that time is described in different ways. An event's time (e.g., EventTime) can hold one or more parameters that do not map to something fixed and instead use an underlying formula/function that, for a given day, can be calculated to determine the time of the event at that day. These functions can be calculated at a server or at a client device, depending on the complexity.

In one implementation, the object intent-time (or "EventTime") can have a number of classes that derive from the base class. One class can be standard time (containing the normal date and time information) and another class can be location-based time, which can include properties of latitude and longitude. In the location-based time, the subclasses can include, but are not limited to, sunset, sunrise, moonset, and moonrise. Another class can be tide-based time, which can contain a property of naval station name (which is an index to a tide table).

The calculation for location-based time may be a function which can be carried out, in some cases, at a client device. Example calculations include, for sunrise or sunset calculating a current day, mean solar noon, solar mean anomaly, equation of the center, ecliptic longitude, solar transit, declination of the Sun, hour angle, and finally sunrise and sunset using the actual Julian date of sunset/sunrise and solar transit in view of the hour angle. In some cases, an application programming interface (API) may be called, which also may provide times for solar noon, civil twilight begin, civil twilight end, nautical twilight begin, nautical twilight end, astronomical twilight begin, astronomical twilight end.

Figure 5A:
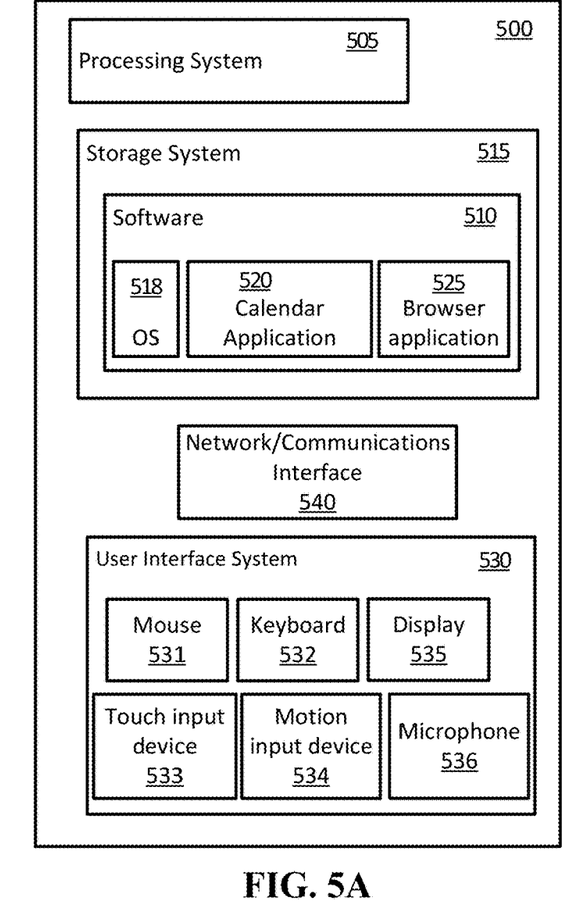
FIGS. 5A and 5B present block diagrams illustrating components of systems that may be used to implement the techniques described herein.
Figure 5B:
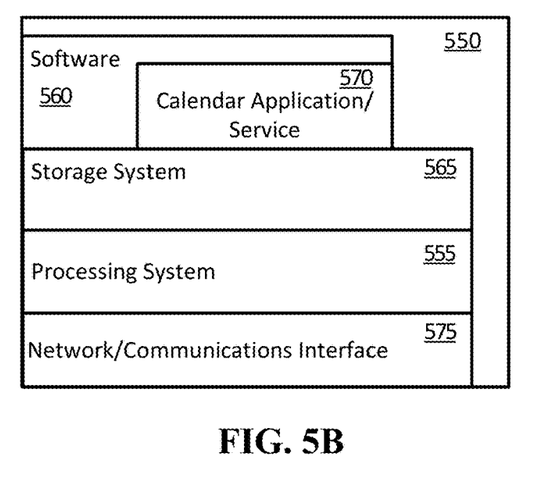

FIGS. 5A and 5B present block diagrams illustrating components of systems that may be used to implement the systems and techniques described herein.

Referring to FIG. 5A, system 500 may represent a computing device such as, but not limited to, a personal computer, a tablet computer, a reader, a mobile device, a personal digital assistant, a wearable computer (e.g., in the form of a watch, glasses, apparel), a smartphone, a laptop computer (notebook or netbook), a gaming device or console, a desktop computer, or a smart television. Accordingly, more or fewer elements described with respect to system 500 may be incorporated to implement a particular computing device.

System 500, for example, includes a processing system 505 of one or more processors to transform or manipulate data according to the instructions of software 510 stored on a storage system 515. Examples of processors of the processing system 505 include general purpose central processing units, application specific processors, and logic devices, as well as any other type of processing device, combinations, or variations thereof.

Storage system 515 may comprise any computer readable storage media readable by the processing system 505 and capable of storing software 510 including the calendar application 520 and/or browsing application 525.

Storage system 515 may include volatile and nonvolatile, removable and non-removable media implemented in any method or technology for storage of information, such as computer readable instructions, data structures, program modules, or other data. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is a storage medium a propagated signal or carrier wave.

Storage system 515 may be implemented as a single storage device but may also be implemented across multiple storage devices or sub-systems co-located or distributed relative to each other. Storage system 515 may include additional elements, such as a controller, capable of communicating with processor 505.

Software 510 may be implemented in program instructions and among other functions may, when executed by system 500 in general or processing system 505 in particular, direct system 500 or the one or more processors of processing system 505 to operate as described herein.

The software 510 can include an operating system 518 and application programs such as a calendar application 520 and/or web browsing application 525. A device operating system 518 generally controls and coordinates the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system 518 may be implemented both natively on the computing device and on software virtualization layers running atop the native device operating system (OS). Virtualized OS layers, while not depicted in FIG. 5A, can be thought of as additional, nested groupings within the operating system space, each containing an OS, application programs, and APIs.

In general, software may, when loaded into processing system 505 and executed, transform computing system 500 overall from a general-purpose computing system into a special-purpose computing system customized as described herein for each implementation. Indeed, encoding software on storage system 515 may transform the physical structure of storage system 515. The specific transformation of the physical structure may depend on various factors in different implementations of this description. Examples of such factors may include, but are not limited to the technology used to implement the storage media of storage system 515 and whether the computer-storage media are characterized as primary or secondary storage.

The system can further include user interface system 530, which may include input/output (I/O) devices and components that enable communication between a user and the system 500. User interface system 530 can include input devices such as a mouse 531, track pad (not shown), keyboard 532, a touch device 533 for receiving a touch gesture from a user, a motion input device 534 for detecting non-touch gestures and other motions by a user, a microphone 536 for detecting speech, and other types of input devices and their associated processing elements capable of receiving user input.

The user interface system 530 may also include output devices such as display screens 535, speakers (not shown), haptic devices for tactile feedback (not shown), and other types of output devices. In certain cases, the input and output devices may be combined in a single device, such as a touchscreen display which both depicts images and receives touch gesture input from the user. Visual output may be depicted on the display 535 in myriad ways, presenting graphical user interface elements, text, images, video, notifications, virtual buttons, virtual keyboards, or any other type of information capable of being depicted in visual form.

The user interface system 530 may also include user interface software and associated software (e.g., for graphics chips and input devices) executed by the OS in support of the various user input and output devices. The associated software assists the OS in communicating user interface hardware events to application programs using defined mechanisms. The user interface system 530 including user interface software may support a graphical user interface, a natural user interface, or any other type of user interface. For example, the calendar views described herein may be presented through user interface system 530.

Communications interface 540 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS 518, which informs applications of communications events when necessary.

It should be noted that many elements of system 500 may be included in a system-on-a-chip (SoC) device. These elements may include, but are not limited to, the processing system 505, a communications interface 540, and even elements of the storage system 515.

Computing system 500 is generally intended to represent a computing system with which software is deployed and executed in order to implement an application, component, or service for a calendar application as described herein. In some cases, aspects of computing system 500 may also represent a computing system on which software may be staged and from where software may be distributed, transported, downloaded, or otherwise provided to yet another computing system for deployment and execution, or yet additional distribution.

Certain aspects described herein may be carried out on a system such as shown in FIG. 5B. Referring to FIG. 5B, system 550 may be implemented within a single computing device or distributed across multiple computing devices or sub-systems that cooperate in executing program instructions. The system 550 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 550 can include a processing system 555, which may include one or more processors and/or other circuitry that retrieves and executes software 560 from storage system 565. Processing system 555 may be implemented within a single processing device but may also be distributed across multiple processing devices or sub-systems that cooperate in executing program instructions.

Examples of processing system 555 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

As with storage system 515 of FIG. 5A, storage system 565 can include any computer readable storage media readable by processing system 555 and capable of storing software 560. Storage system 565 may be implemented as a single storage device but may also be implemented across multiple storage devices or sub-systems co-located or distributed relative to each other. Storage system 565 may include additional elements, such as a controller, capable of communicating with processing system 555.

In some cases, storage system 565 includes one or more storage resources in which calendar information is stored.

Software 560 may be implemented in program instructions and among other functions may, when executed by system 550 in general or processing system 555 in particular, direct the system 550 or processing system 555 to operate as described herein for storing and retrieving calendar events. Software 560 may provide program instructions that embody a calendar application or service 570 implementing the described storage and structure of calendar events.

Software 560 may also include additional processes, programs, or components, such as operating system software or other application software. Software 560 may also include firmware or some other form of machine-readable processing instructions executable by processing system 555.

System 550 may represent any computing system on which software 560 may be staged and from where software 560 may be distributed, transported, downloaded, or otherwise provided to yet another computing system for deployment and execution, or yet additional distribution.

In embodiments where the system 550 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 575 may be included, providing communication connections and devices that allow for communication between system 550 and other computing systems (not shown) over a communication network or collection of networks (not shown) or the air.

It should be noted that many elements of system 550 may be included in a SoC device. These elements may include, but are not limited to, the processing system 555, the communications interface 575, and even elements of the storage system 565.

Figure 6:
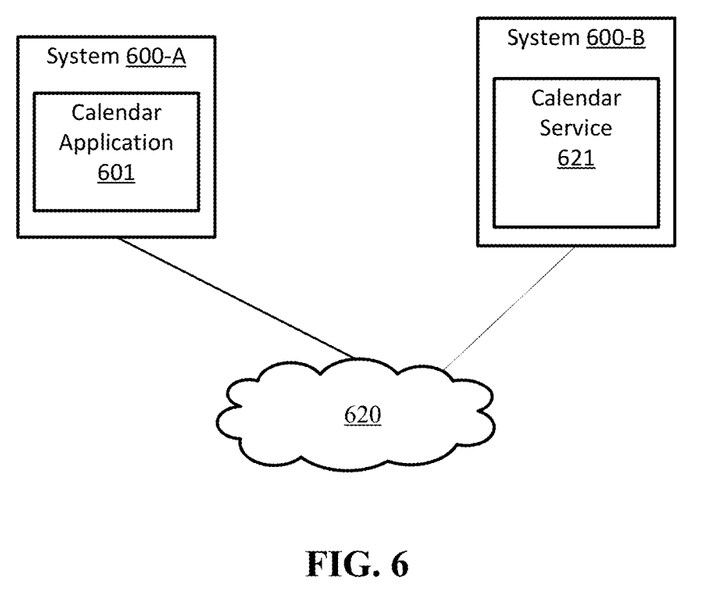
FIG. 6 illustrates an example system architecture in which the described systems and techniques may be carried out.

FIG. 6 illustrates an example system architecture in which the described systems and techniques may be carried out. Referring to FIG. 6, a calendar application 601 may be implemented on a computing system 600-A such as described with respect to system 500 of FIG. 5A. The user of the calendar application 601 may utilize the application to create, edit, or view a calendar event.

Calendar application 601 may communicate over network 620 with associated calendar service(s) 621 contained on system 600-B, which is a particular instance of system 550 described in FIG. 5B. Calendar service(s), of which there may be several types, vendors or providers, and access methods, may be embodied in data structures and processing functions allowing accessibility and interchange with calendar applications 601.

Calendar application 601 and/or calendar service 621 may in some instances communicate with services providing trigger information (e.g., sunrise/sunset times) using APIs to send requests and receive information.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. An API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic.

The API-calling component may be a local component (i.e., on the same data processing system as the API-implementing component) or a remote component (i.e., on a different data processing system from the API-implementing component) that communicates with the API-implementing component through the API over a network. An API is commonly implemented over the Internet such that it consists of a set of Hypertext Transfer Protocol (HTTP) request messages and a specified format or structure for response messages according to a REST (Representational state transfer) or SOAP (Simple Object Access Protocol) architecture.

The network 620 can include, but is not limited to, a cellular network (e.g., wireless phone), a point-to-point dial up connection, a satellite network, the Internet, a local area network (LAN), a wide area network (WAN), a WiFi network, an ad hoc network, an intranet, an extranet, or a combination thereof. The network may include one or more connected networks (e.g., a multi-network environment) including public networks, such as the Internet, and/or private networks such as a secure enterprise private network.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A calendaring system comprising:
    a processing system;
    a storage system;
    structured calendar data stored on a storage resource of the storage system, the structured calendar data comprising, for each intentional-time event of a recurring-type based on natural phenomena, at least:
        a corresponding event identifier,
        a calendar identifier indicating a corresponding calendar to which the intentional-time event belongs,
        an indication of recurrence, and
        a corresponding intent-time event time,
        wherein the corresponding intent-time event time is stored as a function in a structured format that is relative to an external trigger of a natural phenomenon upon which an actual time of the intentional-time event is based, wherein the structured format of the corresponding intent-time event time comprises a location parameter and a phenomena parameter;
    instructions for supporting a calendar application stored on the storage system, the instructions directing the processing system to at least:
        receive a request for a calendar view of events of a calendar;
        search a storage resource storing calendar data for the calendar associated with the request and any events associated with the calendar;
        identify any occurrences of intentional-time events of the recurring-type based on the natural phenomena that fall within a start time and an end time for the calendar view of events, wherein the start time and the end time for the calendar view of events comprises two or more days;
        calculate an event start time and event end time for each occurrence of the intentional-time event of the recurring type based on the natural phenomena that falls within the two or more days for the calendar view of events by executing the function corresponding to the intentional-time event that includes the location parameter and the phenomena parameter,
        wherein executing the function comprises retrieving, by a calendar server or calendar application, a time of an occurrence of the natural phenomenon corresponding to a set of location coordinates indicated by the location parameter and resolved using a geolocation service, from an external trigger information resource service, via an application programming interface, for that intentional-time event and applying an offset from the time in which the natural phenomenon for that intentional-time event occurs,
        wherein the event start time, the event end time, or both the event start time and the event end time are different for at least two occurrences of the intentional-time event; and
        provide any identified occurrences of the intentional-time events and their corresponding event start time and event end time that fall within the two or more days for the calendar view of events to a source of the request.

2. The system of claim 1, wherein the phenomena parameter comprises an astronomical phenomena indicator, wherein the natural phenomenon is an astronomical phenomenon.

3. The system of claim 1, wherein the phenomena parameter comprises a tide phenomena indicator and an index to a tide table, wherein the natural phenomenon is a tide phenomenon.

4. A computer-implemented method comprising:
    receiving, at a server, a request for a calendar view of events of a calendar;
    searching a storage resource storing calendar data for the calendar associated with the request and any events associated with the calendar;
    identifying any occurrences of intentional-time events of a recurring-type based on natural phenomena that fall within a start time and an end time for the calendar view of events, wherein the start time and the end time for the calendar view of events comprises two or more days; and
    calculating an event start time and event end time for each occurrence of the intentional-time event of the recurring-type based on natural phenomena that falls within the two or more days for the calendar view of events by executing a function corresponding to each occurrence of the intentional-time event, wherein each occurrence of the intentional-time event includes a corresponding location parameter and a phenomena parameter,
    wherein executing the function comprises retrieving, by a calendar server or calendar application, a time of an occurrence of a natural phenomenon corresponding to a set of location coordinates indicated by the location parameter and resolved using a geolocation service, from an external trigger information resource service, via an application programming interface, for that intentional-time event and applying an offset from the time of the occurrence of the external trigger for that intentional-time event,
    wherein the event start time, the event end time, or both the event start time and the event end time are different for at least two occurrences of the intentional-time event.

5. The method of claim 4, wherein the phenomena parameter comprises an astronomical phenomena indicator, wherein the natural phenomenon is an astronomical phenomenon.

6. The method of claim 4, wherein the phenomena parameter comprises a tide phenomena indicator and an index to a tide table, wherein the natural phenomenon is a tide phenomenon.

7. The method of claim 4, further comprising:
providing the calculated event start time and event end time of any identified intentional-time events that fall within the two or more days for the calendar view of events to a source of the request.

8. The method of claim 4, further comprising:
providing any individual events and any recurring events that do not include an intent-time event time but that fall within the two or more days for the calendar view of events to a source of the request.

9. One or more computer-readable storage media having instructions stored thereon that, when executed by a processing system, direct the processing system to at least:
receive an input indicative of an intentional-time event of a recurring-type based on natural phenomena;
determine an appropriate intent-time format for the intentional-time event of the recurring-type based on the natural phenomena that is relative to an external trigger of a natural phenomenon upon which an actual time of the intentional-time event is based to at least identify any additional information for the external trigger of the natural phenomenon,
wherein the intent-time format comprises an executable function comprising a location parameter and a phenomena parameter that, when executed:
retrieves, by a calendar server or calendar application, a time of an occurrence of the external trigger of the natural phenomenon corresponding to a set of location coordinates indicated by the location parameter and resolved using a geolocation service, from an external trigger information resource service, via an application programming interface, for that intentional-time event, and
generates at least an event start time by applying an offset from the time of the occurrence of the external trigger for that intentional-time event, wherein the event start time, an event end time, or both the event start time and the event end time are different for at least two occurrences of the intentional-time event;
store an indication of recurrence for the intentional-time event in a storage resource storing calendar data;
store the executable function, including the offset, in the storage resource;
receive a request for a calendar view of events, wherein the request includes a start time and an end time for the calendar view of events that comprises two or more days;
search the storage resource for a calendar associated with the request and any events associated with the calendar that fall within the two or more days; and
provide any identified intentional-time events that fall within the two or more days to a source of the request.

10. The media of claim 9, wherein the phenomena parameter comprises an astronomical phenomena indicator, wherein the natural phenomenon is an astronomical phenomenon.

11. The media of claim 9, wherein the phenomena parameter comprises a tide phenomena indicator, wherein the natural phenomenon is a tide phenomenon.

* * * * *